United States Patent [19]

Crowther et al.

[11] Patent Number: 5,751,710
[45] Date of Patent: May 12, 1998

[54] TECHNIQUE FOR CONNECTING CARDS OF A DISTRIBUTED NETWORK SWITCH

[75] Inventors: William R. Crowther, Lincoln; William P. Brandt, Groton, both of Mass.

[73] Assignee: Cisco Technology, Inc., San Jose, Calif.

[21] Appl. No.: 661,424

[22] Filed: Jun. 11, 1996

[51] Int. Cl.⁶ ................................................. H04L 12/00
[52] U.S. Cl. ...................... 370/423; 370/427; 370/536; 395/311
[58] Field of Search ........................... 370/351, 380, 370/386, 389, 423, 424, 427, 536, 257; 395/200.69, 200.7, 282, 311; 340/825.79, 825.85, 825.86, 825.87, 825.89

[56] References Cited

U.S. PATENT DOCUMENTS

| | | | |
|---|---|---|---|
| 4,821,176 | 4/1989 | Ward | 395/800.19 |
| 4,879,551 | 11/1989 | Georgiou | 340/825.87 |
| 4,968,977 | 11/1990 | Chinnaswamy et al. | 370/351 |
| 5,317,562 | 5/1994 | Nardin et al. | 370/16 |
| 5,386,567 | 1/1995 | Lien et al. | 395/700 |
| 5,491,804 | 2/1996 | Heath et al. | 395/275 |
| 5,583,867 | 12/1996 | Poole | 370/257 |
| 5,625,780 | 4/1997 | Hsieh et al. | 395/311 |

*Primary Examiner*—Hassan Kizou
*Attorney, Agent, or Firm*—Cesari and McKenna, LLP

[57] ABSTRACT

An efficient connection technique maximizes the rate at which data are transferred among source and destination network cards of a distributed network switch. Such maximum data rates are achieved by interconnecting the network cards through a mesh backplane comprising a novel arrangement of direct and indirect paths between the cards and thereafter transferring the data over those paths. In accordance with the invention, the indirect data path utilizes an additional network card of the switch as a 2-hop relay to provide transfer rate efficiency between the source and destination cards.

18 Claims, 6 Drawing Sheets

500

| | 1 | 2 | 3 | 4 | 5 | 6 | 7 | 8 | 9 | 10 | 11 | • • • | 16 |
|---|---|---|---|---|---|---|---|---|---|---|---|---|---|
| 1  |   | 8 | 6 | 4 | 4 | 3 | 3 | 2 | 2 | 2 | 1 | • • | 1 |
| 2  | 8 |   | 6 | 4 | 4 | 3 | 3 | 2 | 2 | 2 | 1 | • •  | 1 |
| 3  | 6 | 6 |   | 4 | 4 | 3 | 3 | 2 | 2 | 2 | 1 | • •  | 1 |
| 4  | 4 | 4 | 4 |   | 4 | 3 | 3 | 2 | 2 | 2 | 1 | • •  | 1 |
| 5  | 4 | 4 | 4 | 4 |   | 3 | 3 | 2 | 2 | 2 | 1 | • •  | 1 |
| 6  | 3 | 3 | 3 | 3 | 3 |   | 3 | 2 | 2 | 2 | 1 | • •  | 1 |
| 7  | 3 | 3 | 3 | 3 | 3 | 3 |   | 2 | 2 | 2 | 1 | • •  | 1 |
| 8  | 2 | 2 | 2 | 2 | 2 | 2 | 2 |   | 2 | 2 | 1 | • •  | 1 |
| 9  | 2 | 2 | 2 | 2 | 2 | 2 | 2 | 2 |   | 2 | 1 | • •  | 1 |
| 10 | 2 | 2 | 2 | 2 | 2 | 2 | 2 | 2 | 2 |   | 1 | • •  | 1 |
| 11 | 1 | 1 | 1 | 1 | 1 | 1 | 1 | 1 | 1 |   |   | • •  | 1 |
| •  | • | • | • | • | • | • | • | • | • | • | • |      | 1 |
| •  | • | • | • | • | • | • | • | • | • | • | • | •    | 1 |
| 16 | 1 | 1 | 1 | 1 | 1 | 1 | 1 | 1 | 1 | 1 | 1 | 1    |   |

500

|    | 1 | 2 | 3 | 4 | 5 | 6 | 7 | 8 | 9 | 10 | 11 | • | • | • | 16 |
|----|---|---|---|---|---|---|---|---|---|----|----|---|---|---|----|
| 1  |   | 8 | 6 | 4 | 4 | 3 | 3 | 2 | 2 | 2  | 1  | • | • |   | 1  |
| 2  | 8 |   | 6 | 4 | 4 | 3 | 3 | 2 | 2 | 2  | 1  | • | • |   | 1  |
| 3  | 6 | 6 |   | 4 | 4 | 3 | 3 | 2 | 2 | 2  | 1  | • | • |   | 1  |
| 4  | 4 | 4 | 4 |   | 4 | 3 | 3 | 2 | 2 | 2  | 1  | • | • |   | 1  |
| 5  | 4 | 4 | 4 | 4 |   | 3 | 3 | 2 | 2 | 2  | 1  | • | • |   | 1  |
| 6  | 3 | 3 | 3 | 3 | 3 |   | 3 | 2 | 2 | 2  | 1  | • | • |   | 1  |
| 7  | 3 | 3 | 3 | 3 | 3 | 3 |   | 2 | 2 | 2  | 1  | • | • |   | 1  |
| 8  | 2 | 2 | 2 | 2 | 2 | 2 | 2 |   | 2 | 2  | 1  | • | • |   | 1  |
| 9  | 2 | 2 | 2 | 2 | 2 | 2 | 2 | 2 |   | 2  | 1  | • | • |   | 1  |
| 10 | 2 | 2 | 2 | 2 | 2 | 2 | 2 | 2 | 2 |    | 1  | • | • |   | 1  |
| 11 | 1 | 1 | 1 | 1 | 1 | 1 | 1 | 1 | 1 | 1  |    | • | • |   | 1  |
| •  | • | • | • | • | • | • | • | • | • | •  | •  |   |   | • | 1  |
| •  | • | • | • | • | • | • | • | • | • | •  | •  |   |   | • | 1  |
| 16 | 1 | 1 | 1 | 1 | 1 | 1 | 1 | 1 | 1 | 1  | 1  | 1 |   |   |    |

FIG. 5

TECHNIQUE FOR CONNECTING CARDS OF A DISTRIBUTED NETWORK SWITCH

FIELD OF THE INVENTION

This invention relates generally to network switches and, more particularly, to an arrangement for efficiently interconnecting cards of a network switch.

BACKGROUND OF THE INVENTION

A switched communication network comprises a collection of interconnected nodes in which data are routed through the network between communicating nodes. The nodes may be computers configured as end nodes and intermediate nodes, the latter connecting only to the end nodes or other intermediate nodes of the network. These intermediate nodes function primarily to provide a switching facility that transfers data among the other nodes and, thus, are generally referred to as network switches. As used herein, the term "network switch" includes bridges, routers and other similar intermediate network nodes.

The network switch typically comprises an enclosure having a plurality of connector slots for receiving network cards, such as input/output line cards. The network cards are, in turn, interconnected by a backplane of wires that is often controlled by a switching matrix to transfer data among the cards. Typically, the matrix comprises circuitry contained on a switch card that is centrally-located (with respect to the backplane) for receiving and transmitting data among source and destination cards internal to the switch.

The centralized switching matrix may be implemented as a bus, a cross-bar or other type of interconnection of wires, such as a cube. A bus is a multipoint data path that interconnects more than two cards. Because multiple cards share a single data path, only one may transmit at a time; this raises the problem of determining which card may transmit at any point in time. A centrally-located switch card matrix may also function as an arbiter to resolve such contention. Although an inexpensive solution, this approach provides relatively low performance because it cannot handle significant parallel activity.

In contrast, a cross-bar switching matrix provides a point-to-point connection between a source card transmitting data and the switch card, and a further point-to-point connection between the switch card and the destination card. Each connection thus requires the establishment of a physical, cross-point path through the switch card that is dedicated solely to the transfer of data between the source and destination cards. Here, the number of connections increases with the square of the number of cards in the switch; these connections may be large, even where a physical path consists of a single wire.

However, a single wire connection between cards may be insufficient to provide the bandwidth required for relatively high-data rate applications. In this case, each point-to-point connection typically comprises many wires which, for a conventional network switch, results in a voluminous number of wires in the enclosure. A very large connector assembly would be required to accomodate these wires at the switch card. Yet, a typical connector of such size may not fit in the enclosure, thereby necessitating use of an expensive, customized connector. In the alternative, the connector function must be apportioned onto two or three cards which consumes valuable card space in the enclosure.

A more significant problem with the cross-bar switch may concern its susceptibility as a single point of failure. That is, loss of a single cross-point path in the switch card destroys the connection between the two corresponding cards, a situation that effectively renders the network switch inoperable. A solution to this latter problem may be to provide two, redundant switch cards per enclosure, although this is an expensive and complicated option primarily because of redundancy and synchronization requirements.

An alternative to the cross-bar arrangement is the cube interconnect, e.g., the hybercube network. The hybercube network is typically employed for interconnecting many (N) processing elements in an n-dimensional cube arrangement, where $N=2^n$. Here, each processing element is connected to n other elements with the longest communication path from any two elements being n connections. For example, a 4-dimensional hypercube contains 16 processing elements where each element is connected to four other elements.

According to this architecture, data transfers originating from any source element must expect to traverse 4 "hops" to reach a destination: one hop to get into the correct set of 8 elements, another hop to get into the proper set of 4 elements, another to reach the desired set of 2 elements and then a last hop to the proper destination. Doubling the number of processing elements results in a unit increase in the communication path length. Furthermore, the cube architecture requires that all processing elements be present to enable such multiple-hop transitions.

The present invention is directed to reducing the number of hops required to efficiently transfer data between a source element and a destination element in a communication network. More specifically, the invention is directed to eliminating the conventional switching function of a network switch by regulating the flow of data over a configuration of interconnected network cards in a manner that reduces the number of hops needed to optimize data transfer efficiency through the switch.

SUMMARY OF THE INVENTION

The invention comprises an efficient connection technique for maximizing the rate at which data are transferred among source and destination network elements of a distributed network switch. Such maximum data rates are achieved by interconnecting the network elements through a mesh backplane comprising a novel arrangement of direct and indirect paths between the elements and thereafter, transferring the data over those paths. In accordance with the invention, the indirect data path utilizes an additional network element of the switch as a 2-hop relay to provide transfer rate efficiency between the source and destination elements. Significantly, the arrangement of direct and indirect paths obviates use of a convention switching matrix.

In the illustrative embodiment, the backpane may be a full or partial mesh arrangement of direct/indirect data paths administered by circuitry distributed among each of the network elements, e.g., cards, of the switch. Data path administration is preferably the result of a transfer rate process performed by the circuitry in connection with a conventional routing algorithm. That is, the distributed circuitry initially cooperate to establish a direct path for transferring data among selected source and destination cards. If the data to be transferred exceeds the maximum amount allowable over that direct path, the circuitry further selects an additional network card as a relay for transferring the excess data over an indirect path between the source and destination.

Advantageously, the inventive connection technique eliminates the conventional "switching" function of a network switch by regulating the flow of data over a parallel configuration of interconnected network cards selected to optimize data transfer efficiency through the switch. The novel arrangement of direct and indirect data paths further accomodates both failed and missing network cards in the switch to generally simulate a point-to-point, centralized switch in a cost-effective manner. Moreover, the geometry of the connection technique defines an asymmetric mesh arrangement characterized by a maximum 2-hop relay traversal between source and destination cards that differs from the conventional cube architecture.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 5 is a table depicting the number of connections needed between cards of the network switch in order to ensure full bandwidth access in accordance with the novel connection technique of the present invention;

DETAILED DESCRIPTION OF ILLUSTRATIVE EMBODIMENT

Figure 1:
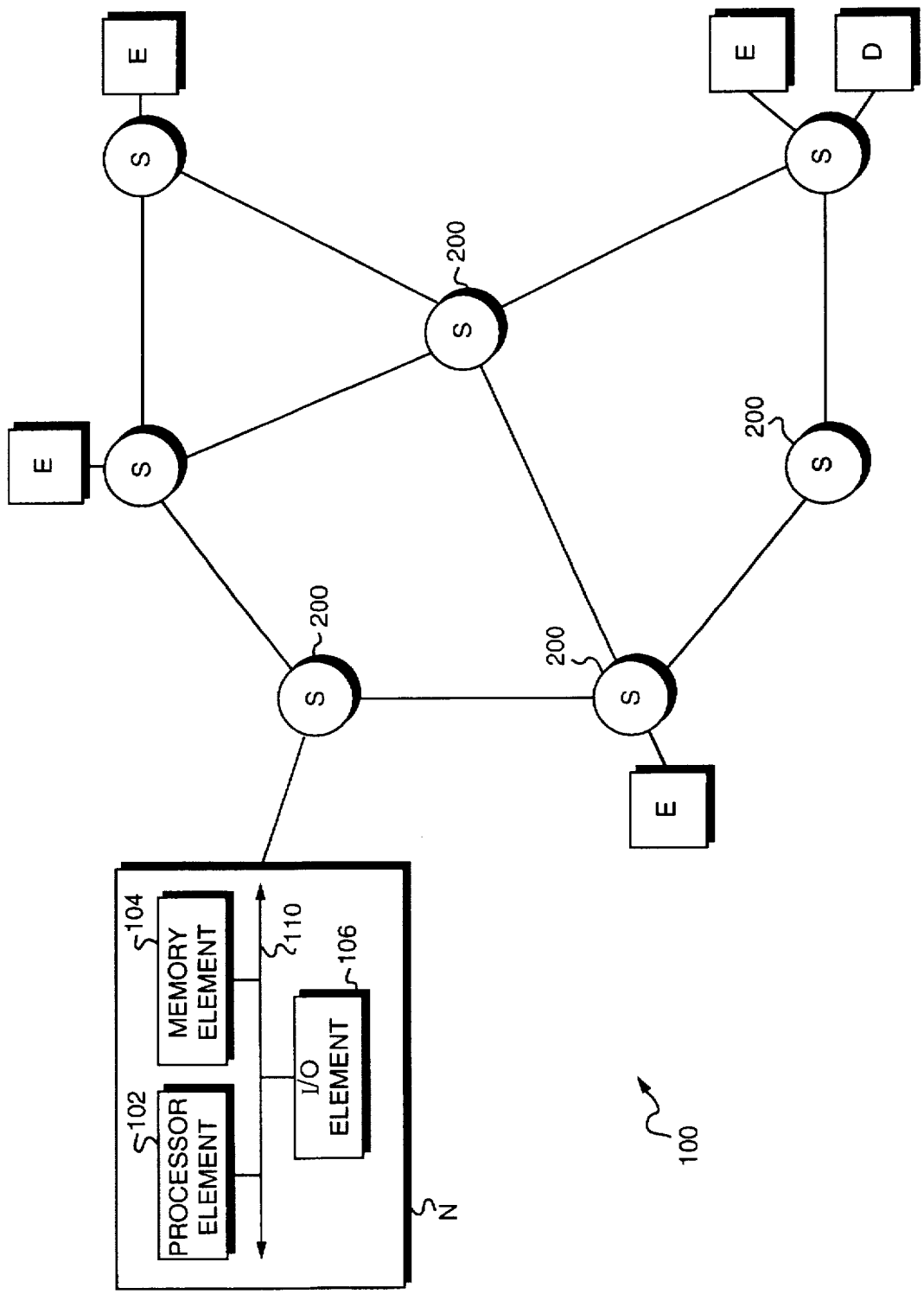
FIG. 1 is a schematic block diagram of a communication network comprising a collection of interconnected nodes including a network switch.

FIG. 1 is a schematic block diagram of a communication network 100 of interconnected nodes in which the novel connection technique of this invention may be advantageously used. The nodes are typically general-purpose computers comprising a source node N, end nodes E and a destination node D. Each node is coupled to a respective network switch "S" 200, which is preferably a specialized computer that provides a facility for transferring data between the source and destination nodes.

Each node typically comprises a processor element 102, a memory element 104 and at least one input/output (I/O) element 106 interconnected by a bus 110. The memory element 104 may comprise storage locations composed of random access memory (RAM) devices, which are addressable by the processor element 102 and I/O element 106. An operating system, portions of which are typically resident in memory and executed by the processor, functionally organizes the node by, inter alia, invoking network operations in support of software processes executing on the node.

Figure 2:
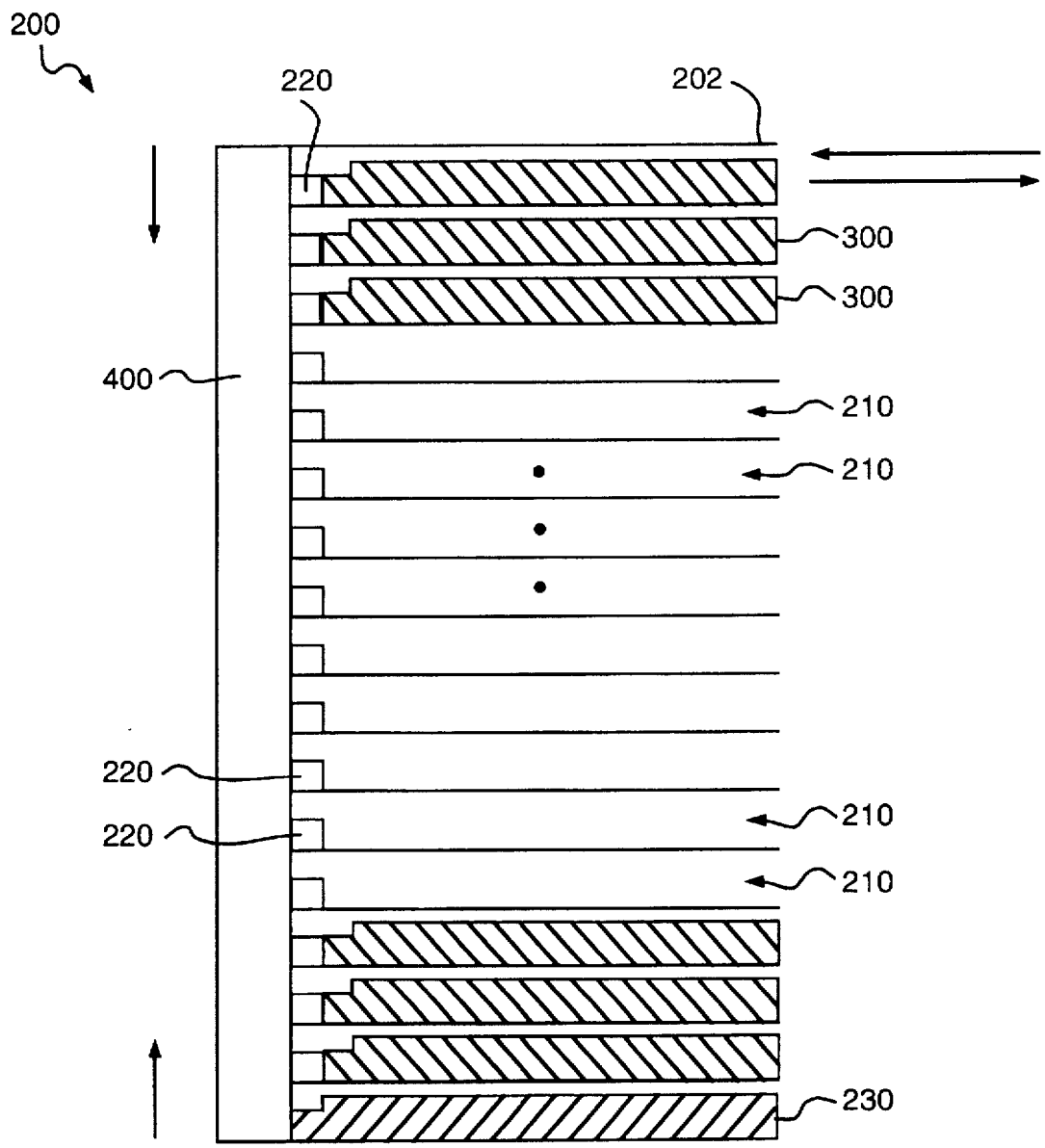
FIG. 2 is a schematic block diagram of the network switch having a plurality of network elements in which the invention may be advantageously used.

FIG. 2 is a schematic block diagram of the network switch 200 comprising an enclosure 202 having a plurality of slots 210 terminated by connectors 220, each of which is configured to receive a network card. The network cards consist of a plurality of line cards 300 and a utility card 230, the latter providing maintenance functions and containing timing and storage capabilities. When inserted into respective connector slots, the cards communicate within the switch 200 by transmitting and receiving data over a backplane 400 of wires interconnecting the connectors.

Illustratively, the switch is preferably embodied as a 16-slot enclosure, although other embodiments may include 8-, 24- or 32-slot enclosures. A feature of the present invention is the interchangeability of the cards inserted into the backplane 400; that is, the same cards may be reused in any of the different slotted enclosures contemplated by the invention. In an alternate embodiment, the switch may be configured as two enclosures connected in tandem to increase the capacity of the switch. Each of the embodiments may be configured to operate in accordance with the novel connection technique described herein.

Figure 3:
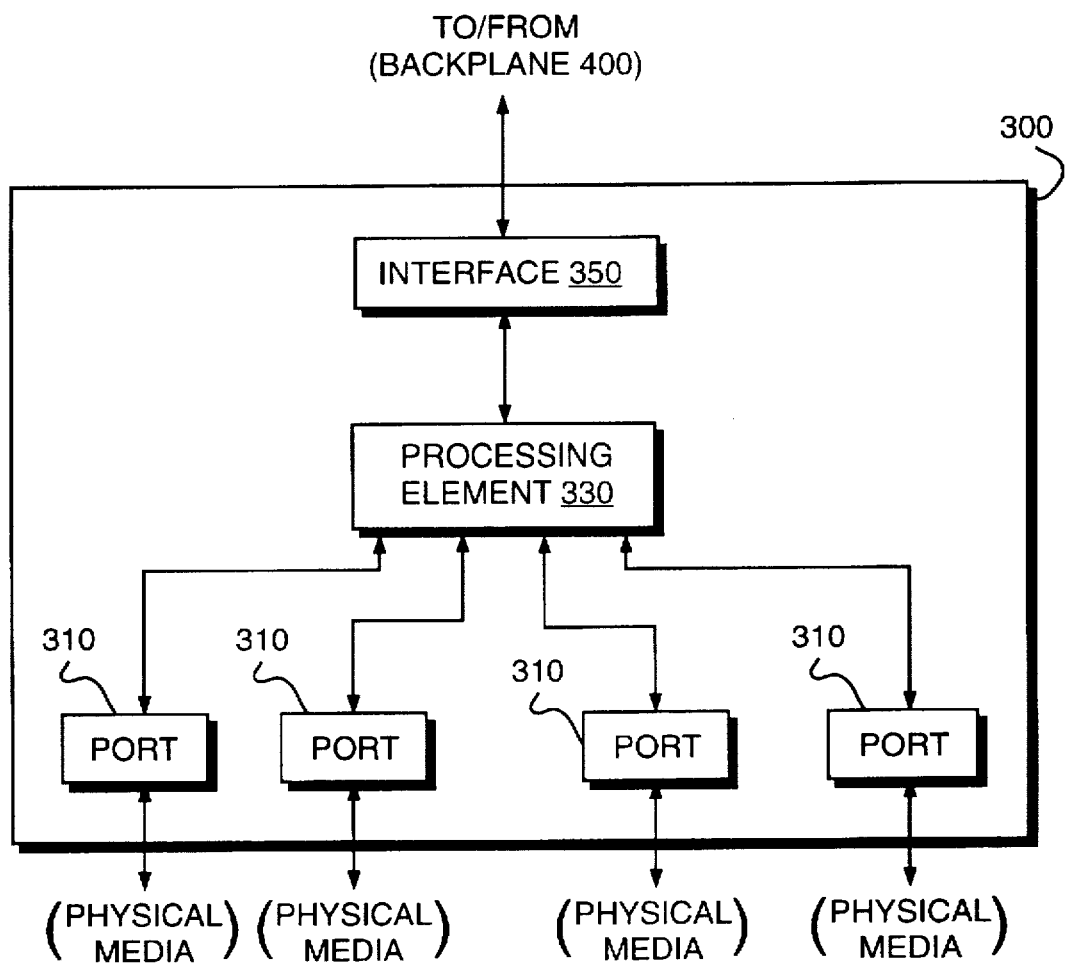
FIG. 3 is a schematic diagram of a network element of FIG. 2, such as an input-output line card.

FIG. 3 is a schematic diagram of a line card 300 that contains a plurality of ports 310 functioning as edge or trunk-type connectors for attaching to physical communication media (PHYSICAL MEDIA), such as Ethernet, Fiber Distributed Data Interface, Synchronous Optical Network Asynchronous Transfer Mode (ATM) and High Level Data-Link Control/Synchronous Data-Link Control format media. Various data processing communication functions, such as packet-type detection, are performed on this card in connection with a processing element 330. Alternatively, the line card may be configured to transfer data in accordance with ATM applications. For these applications, information is transferred in the form of ATM cells, each of which contains data and address information.

In the illustrative embodiment, there are preferably four (4) 625 megabits per second (Mb/s) input/output ports per line card and the inventive distributed switch arrangement preferably supports sixteen (16) I/O line cards. Accordingly, each card may provide 2.5 gigabits per second (Gb/s) of input/output traffic and the switch may transfer approximately forty (40) Gb/s of data traffic among its ports. To this end, each line card also contains a connection interface (INTERFACE) circuit 350 configured to format data and execute routing decisions for transferring that data over the backplane 400 of the switch 200 to other network cards. In particular, the connection interface 350 contains the circuitry needed to receive data from the backplane and pass it to the processing element 330, and to receive data from the processing element 330 and pass it over a direct or indirect path of the backplane 400, as described further herein.

Referring also to FIG. 2, it was noted that a switching matrix is typically employed to control the transfer of data over the backplane 400 and among the cards 300. Typically, the matrix comprises circuitry contained on a centrally-located switch card for receiving and transmitting data among source and destination cards within the switch. An example of such a switching matrix is a cross-bar switch that establishes a point-to-point wire connection between the source and destination cards over the backplane.

As further noted, the switch 200 illustratively accomodates 16 connector slots 210. If the slots are fully populated with cards 300, the cross-bar switching matrix ensures that each card has a direct path to every other card using the point-to-point wires of the backplane. Ideally, 1/16th of the total traffic bandwidth is allocated between pairs of cards. This arrangement provides maximum performance for uniform traffic mix through the switch, but results in degraded performance where significant traffic occurs between a specific pair of source and destination cards, primarily because the switching function of the matrix obviates the use of the other point-to-point wires which may otherwise be idle.

Figure 4:
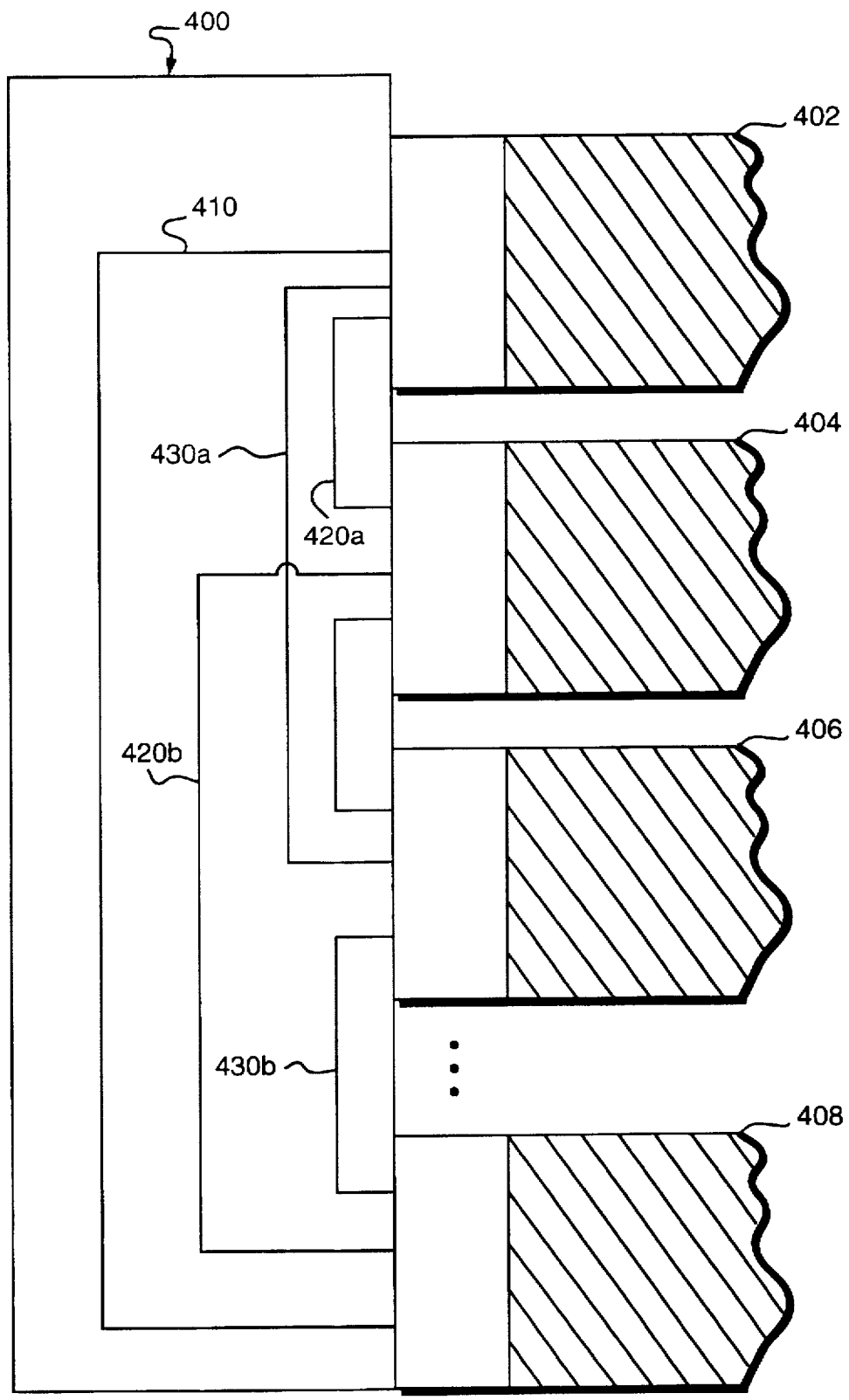
FIG. 4 is a schematic diagram illustrating an embodiment of a novel connection technique comprising an arrangement of direct and indirect data 15 paths between the network elements in accordance with the invention.

It would be desirable to utilize the idle backplane wires in connection with the transfer of data between the source and destination card pair. The present invention is directed to utilizing these otherwise idle wires and to eliminating the conventional switching function of a network switch by regulating the flow of data over an arrangement of interconnected network cards selected to optimize data transfer efficiency through the switch. Such an inventive arrangement is shown in FIG. 4.

Specifically, the invention comprises an efficient connection technique for maximizing the rate at which data are transferred among source and destination cards of a distributed network switch. Maximum data rates are achieved by interconnecting the network cards through a mesh backplane 400 comprising a novel arrangement of direct and indirect paths for transferring data between the cards. As can be seen in FIG. 4, a source card 402 is connected to a destination card 408 over a direct data path 410; these cards are further connected by way of indirect data paths 420a,b (hereinafter designated 420) and 430a,b (hereinafter designated 430).

Notably, each of these indirect data paths utilize a single, additional network card of the switch as a 2-hop relay to provide transfer rate efficiency between the source and destination cards. For example, network card 404 is used as a relay within indirect data path 420 and network card 406 is used as a relay within indirect data path 430. By utilizing a single relay, the inventive technique enables the source card 402 to obtain full bandwidth of the system using a portion of the total backplane wires that is greater than that allotted for each card of the cross-bar switching matrix system. In addition, the inventive technique eliminates the need for such a conventional switching matrix.

As will be described further herein, the actual number of wire connections needed to achieve full bandwidth performance generally increases at a rate of twice the number of cards (2N) in the box, whereas the centralized scheme increases at rate of $N^2$. Thus, in a fully-populated, 16-slot switch embodiment, 32 wire connections are needed, depending upon the particular type of wire used. It should be noted that the actual number of 20 wires needed will differ among different slotted switches; yet, that number is generally smaller than the number needed for a centralized switch.

For example, if N cards are connected by a plurality of wires, each having a bandwidth of 1 W, then the mesh supports NW/2wires for each card. If N equals 16, the mesh will support 8 times the bandwidth of a single wire, whereas if N equals 32, the mesh supports 16 times the bandwidth of a single wire. In an illustrative embodiment, the bandwidth per wire is typically 400 Mb/s, although 800 Mb/s wires may also be used.

The novel arrangement of direct and indirect data paths also accomodates an embodiment wherein network switch cards are missing. Preferably, the network cards are inserted into the slots 210 contiguously from either end of the enclosure 202, as indicated by the arrows in FIG. 2. In general, the number of paths needed to maintain a full bandwidth connection between any source and destination card pair declines as the number of inserted cards increases because of the ability to traverse a relay between the pair of cards. More specifically, in the case of missing cards in the 16-slot switch enclosure, the number of wires roughly doubles. Therefore, the entire mesh supports NW wires for each card.

Additional wires may be added between cards to ensure that there are sufficient relays in the event one of the inserted cards fails. For example, to guard against a failed inserted card, forty (40) wire connections may be employed instead of the thirty-two (32) wire connections of the typical 16-slot switch. Accordingly, the entire mesh supports approximately 2.5NW/2 wires for each card. In the case where more than one card fails, an additional 0.5x wire is needed for each failed card.

The amount of traffic delivered to the network by an output port of a line card 300 is typically a fraction of the amount of traffic received by the input port. However, a situation may arise wherein several cards provide significant traffic to the same card for transmission onto the network, resulting in an overload condition. For example, the amount of traffic accomodated by each port of a card is preferably limited to 625 Mb/s. However, several cards may have data destined to the same output port of a card; in this case, there may be at least 1200 Mb/s traffic on that latter port. Since only 625 Mb/s data traffic can be delivered by the port, some traffic must ordinarily be discarded. To avoid this situation, the novel connection technique provides a mesh that supports 3NW/2 wires for each card; this provides sufficient bandwidth to handle a temporary overload condition. It should be noted that these numbers of wires are "rules of thumb" for a 16-slot enclosure; the numbers may vary for other network switches having different slot capacities.

FIG. 5 is a table 500 depicting the number of connections needed between cards inserted into the switch in order to ensure access to the full bandwidth of the switch. As can be seen, many connections, e.g., "8", are needed between a first (1) and second (2) card, while fewer connections are needed among the additionally-inserted cards because traffic can be relayed through other cards functioning as 2-hop relays in the switch. Collectively, these connections provide a novel asymmetric mesh backplane arrangement.

According to the invention, the connection arrangement is configured to maintain a required bandwidth within the switch even if cards beyond a certain point are missing. Thus, if the switch is fully-populated, e.g., all 16 cards are inserted, only a single connection between each card is sufficient. But if only 8 cards are inserted into the switch, two connections are needed between the cards and in the case where only 4 cards are inserted, four connections are needed to achieve full-bandwidth performance between those cards.

Although the invention reduces the number of wire connections needed for a fast and efficient distributed switch implementation, it does so at the expense of extensive data path administration of routing decisions. Because of the fast data rates used in the switch, each network card 300 contains a special interface circuit 350 (FIG. 3) whose functions include rendering forwarding decisions for the data traversing the novel connection arrangement, and to format that data for transfer over the data paths of the backplane 400 to the network cards. The connection interface circuit 350 is preferably implemented as an application specific integrated circuit (ASIC); in accordance with the invention, the ASIC contains interface circuitry that is distributed among each of the network cards.

It will be apparent to those skilled in the art that the interface 350 contains circuitry needed to implement the logical and arithmetic operations of rendering forwarding decisions and formating data in order to transfer that data over the inventive arrangement of direct and indirect paths. The exact circuit configuration of interface 350, along with the exact arithmetic and logical operations performed by that circuit, can be varied without departing from the spirit and scope of the invention.

Included among the administrative duties of the interface circuitry 350 is the assessment as to whether a network card is currently used as a relay. For a fully-loaded 16-slot switch, all sixteen network cards may theoretically be used to transfer data from a source card to a destination card, i.e., there may be one direct connection between the source and destination, and fourteen indirect 2-hop relay connections between those cards.

In general, a source network card has access to 50% of the switch's resources. That is, a first source card may use a particular network card as a relay "half-the-time" while a second source card may utilize that relay the rest of the time. This arrangement is possible because each relay may simultaneously function as two hops: as a first hop for the first source card and as a second hop for the second card. A source card may realize these resources by either always using half of the cards of the switch or partially using all of the cards.

Because the interface circuitry 350 is involved in all aspects of data transfer within the switch, they do not contain sufficient buffer capacity to store the data transferred among the cards. Accordingly, data transfer is "cut-through" these distributed switching circuits using a transfer rate process preferably performed by the circuitry 350 in connection with a conventional routing algorithm. According to the process, the distributed circuitry 350 initially cooperate to establish a direct path 410 (FIG. 4) for transferring data among selected source and destination cards, "on-the-fly". If the data to be transferred exceeds the maximum amount allowable over that direct path, the circuitry further selects an additional network card as a relay for transferring the excess data over an indirect path 420, 430 between the source and destination. Preferably, the transfer of data over the direct and indirect paths occur simultaneously, although various degrees of overlap and non-overlap of such data transfers are contemplated by the invention. Similarly, establishment of the indirect data path may occur generally contemporaneously with the establishment of the direct data path.

To facilitate such on-the-fly transfers, each network card is provided with control information relating to the traffic patterns among the network cards. That is, each interface circuit 350 broadcasts its input traffic over the backplane 400 to every other circuit, and each circuit 350 further executes the same routing algorithm to configure its output ports. This latter output configuration information is also broadcast to all the network cards so that data may be cut-through the backplane interconnecting the cards. As a result, the distributed switch behaves like a centralized, cross-bar switch without the conventional central switching matrix since the switching functions are performed by the interface circuits.

Figure 7:
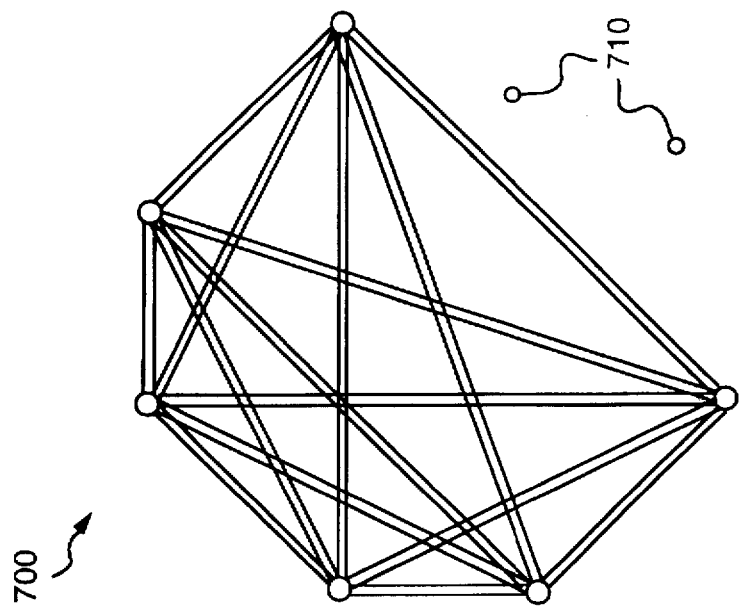
FIG. 7 is a highly schematized diagram of a partial mesh arrangement for interconnecting network cards in accordance with the novel connection technique of the present invention.
Figure 6:
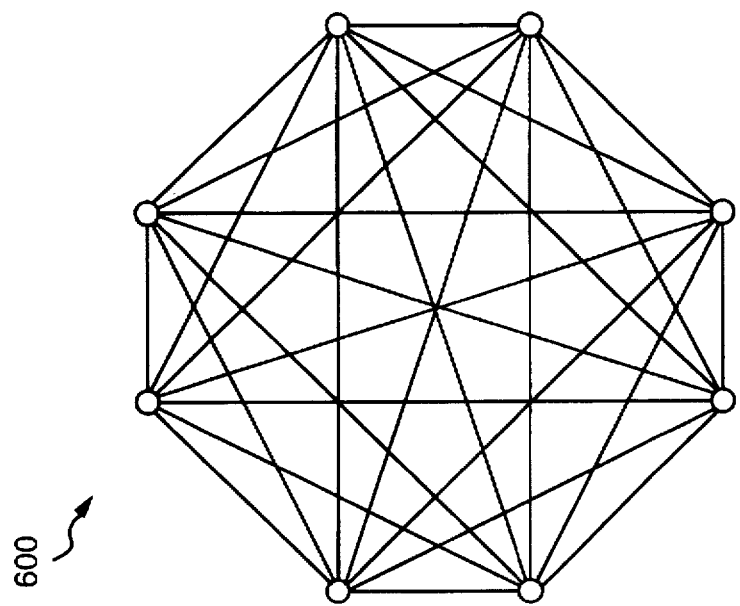
FIG. 6 is a highly schematized diagram of a full mesh arrangement for interconnecting cards of the network switch in accordance with the novel connection technique of the present invention.

In the illustrative embodiment, the backpane may be a full or partial mesh arrangement of data paths administered by the distributed interface circuitry 350. FIG. 6 is a highly schematized diagram generally depicting a full mesh 600 for a fully-populated 8-slot switch. It can be seen that the relatively small number of cards increases the number of data paths so that there is generally a 4-to-1 ratio of wires. FIG. 7, on the other hand, generally depicts a partial mesh 700 with the missing cards denoted by unconnected dots 710. In the case where cards are missing, the general rule is that the number of wires coupling the remaining cards is doubled.

Advantageously, the invention provides a novel technique for interconnecting cards within a distributed network switch while eliminating the conventional switching function of the switch by performing all transfer functions within the interface circuitry. The distributed switch invention further eliminates the single point of failure present in the centralized switch. According to the connection technique described herein, if a card fails only that card (and its relay point) is lost. The control information provided to the interface circuitry relating to the traffic patterns among the network cards allows that circuitry to detect failure of a card. Moreover, the geometry of the connection technique defines an asymmetric mesh arrangement characterized by a maximum 2-hop relay traversal between source and destination cards that differs from the conventional cube architecture.

While there has been shown and described an illustrative embodiment for maximizing the rate at which data are transferred among source and destination network cards of a distributed network switch using an efficient connection technique, it is to be understood that various other adaptations and modifications may be made within the spirit and scope of the invention. For example, although the invention utilizes an additional network card of the switch as an indirect data path to provide a 2-hop relay between the source and destination cards, use of additional relays is contemplated by the invention. However, in the case of a full, uniform mesh, data is transferred over every path in a worst-case traffic pattern so there is generally nothing to be gained going to, e.g., a 3-hop relay arrangement. Although the extra connections provided between the cards of a 3-hop arrangement may slightly increase the data transfer efficiency, the complexity of scheduling 3-hop relays, i.e., a source card to a relay to another relay and finally to a destination card, generally outweighs that advantage. Unlike the single-hop, direct connection arrangement where a significant number of wires are unused for many traffic patterns, the 2-hop arrangement described herein utilizes most of the wires.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A connection arrangement for maximizing the rate at which data are transferred among cards of a distributed switch, the arrangement comprising:

a backplane of the switch; and a plurality of cards coupled to the backplane, the cards including a source card, a destination card and an intermediate card interconnected in a manner such that the source card is directly and indirectly connected to the destination card, the latter indirect connection utilizing the intermediate card as a relay, wherein data is transferred from the source card to the destination card over each of the direct and indirect connections to maximize the transfer rate efficiency between the source and destination cards.

2. The connection arrangement of claim 1 wherein the backplane comprises a mesh backplane.

3. The connection arrangement of claim 1 wherein the backplane comprises an asymmetric mesh backplane.

4. The connection arrangement of claim 3 further comprising means for administering the transfer of data over the direct and indirect connections.

5. The connection arrangement of claim 4 wherein the administering means comprises connection interface circuitry located on each card, and wherein the connection interface circuitry initially establishes the direct connection for transferring of data between the source and destination cards, and further establishes the indirect connection for transferring data between the source and destination cards.

6. The connection arrangement of claim 5 wherein the transfer of data over the direct and indirect connections occur simultaneously.

7. A connection arrangement for maximizing the rate at which data are transferred among network cards of a distributed network switch, the arrangement comprising:

a mesh backplane of the network switch; and a plurality of network cards coupled to the backplane, the network cards including a source card, a destination card and at least one intermediate card interconnected in a manner such that the source network card is connected to the destination network card via a direct data path and via an indirect data path including the intermediate card as a relay; and means for transferring data from the source card to the destination card over an arrangement of the direct and indirect data paths to maximize the transfer rate efficiency between the source and destination cards.

8. The connection arrangement of claim 7 wherein the mesh backplane comprises one of a full and partial mesh backplane.

9. The connection arrangement of claim 8 wherein the indirect data path utilizes the intermediate card as a 2-hop relay.

10. The connection arrangement of claim 9 wherein the transferring means comprises connection interface circuitry located on each card.

11. The connection arrangement of claim 9 wherein the connection interface circuitry of each card initially cooperate to establish the direct data path for transferring data between the source and destination cards and, if necessary, further cooperate to establish the indirect data path for transferring data between the source and destination cards.

12. The connection arrangement of claim 11 wherein the transfer of data over the direct and indirect data paths occur simultaneously.

13. The connection arrangement of claim 12 wherein the connection interface circuitry is implemented as an application specific integrated circuit.

14. A method for maximizing the rate at which data are transferred among network cards of a distributed network switch, the method comprising the steps of:

coupling a plurality of network cards to a backplane of the network switch, the network cards including a source card, a destination card and a plurality of intermediate cards;

configuring the backplane so that the source network card is connected to the destination network card via a direct data path and via a plurality of indirect data paths, the indirect data paths including intermediate cards functioning as relays between the source and destination cards; and selecting an indirect data path having an intermediate card utilized as a 2-hop relay; and transferring data from the source card to the destination card over an arrangement of the direct data path and selected indirect data path to maximize the transfer rate efficiency between the source and destination cards.

15. The method of claim 14 wherein the configuring step further comprises the steps of:

establishing the direct data path for transferring data between the source and destination cards; and contemporaneously establishing the selected indirect data path for transferring data between the source and destination cards.

16. The method of claim 15 wherein the step of transferring data over the direct and indirect data paths occur simultaneously.

17. The method of claim 15 wherein the step of transferring data over the direct and indirect data paths occur substantially non-simultaneously.

18. The method of claim 15 wherein the step of transferring data over the direct and indirect data paths occur substantially simultaneously.

* * * * *